June 8, 1965     E. RAMSTEIN     3,188,444
RESISTANCE WELDING MACHINE

Filed Nov. 5, 1962     2 Sheets-Sheet 1

Inventor:
ERICH RAMSTEIN

BY Michael S. Striker
his ATTORNEY

June 8, 1965  E. RAMSTEIN  3,188,444

RESISTANCE WELDING MACHINE

Filed Nov. 5, 1962  2 Sheets-Sheet 2

Inventor:
ERICH RAMSTEIN

BY Michael J. Striker
his ATTORNEY

United States Patent Office 3,188,444
Patented June 8, 1965

3,188,444
RESISTANCE WELDING MACHINE
Erich Ramstein, Wettingen, Aargau, Switzerland, assignor to H. A. Schlatter A.G., Zurich, Switzerland
Filed Nov. 5, 1962, Ser. No. 236,472
Claims priority, application Switzerland, Nov. 8, 1961, 12,960/61
15 Claims. (Cl. 219—56)

The present invention relates to resistance welding machines in general, and more particularly to an improved projection welding machine which is known as a cross-wire welding machine. Such machines are utilized in the manufacture of net- or grid-like structures, e.g., concrete reinforcing mesh, fence wire and many others.

It is an important object of my invention to provide a cross-wire welding machine which is constructed and assembled in such a way that the wear on its electrodes is reduced to a minimum whereby the electrodes may be used for longer periods of time and the machine may be used without interruptions much longer than all such conventional cross-wire welding machines of which I am aware at this time.

Another object of the invention is to provide a welding machine of the just outlined characteristics which may be rapidly converted for the manufacture of different types of net-like products and which comprises a comparatively small number of component parts.

A further object of my invention is to provide a welding machine for the production of wire mesh and the like which is constructed and assembled in such a way that one of each pair of its welding electrodes is automatically moved toward or away from the work when the other electrode of the respective pair is moved to an operative or idle position so that it is sufficient to provide a single pressure generating device for each pair of electrodes.

An additional object of the invention is to provide a very simple and reliable pressure generating device for use in a welding machine of the above outlined characteristics.

Still another object of the instant invention is to provide a cross-wire welding machine wherein each pair of electrodes is automatically arrested at a predetermined distance from the work to permit shifting of the work without any frictional engagement between the electrodes and the work at the time one of the electrodes is moved to its idle position.

A concomitant object of the invention is to provide a welding machine of the above outlined characteristics wherein the work itself may assist one of the electrodes to move to its operative position when the other electrode is caused to assume an operative position.

With the above objects in view, the invention resides in the provision of a welding machine, particularly for forming joints between intersecting longitudinal and transverse wire- or rod-like components which form a grid- or net-like work. In its elementary form, the machine comprises a supporting member, carrier means pivotally mounting the supporting member so that the latter is preferably swingable about a horizontal pivot axis, a first electrode fixed to the supporting member, a second electrode which is normally located at a level above and which is reciprocable toward and away from the first electrode, guide means for guiding the work between the electrodes, and pressure generating means mounted on the supporting member and operatively connected with the second electrode for reciprocating the same so that, once the second electrode engages the work and the pressure generating means continues to move this second electrode in a direction toward the first electrode, the supporting member pivots automatically with respect to its carrier means to move the first electrode into engagement with the work at a point opposite the second electrode. It is preferred to mount the supporting member in such a way that it returns by gravity to an idle position in which the first electrode is spaced from the work as soon as the pressure generating means moves the second electrode away from the work, and the carrier means may provide a stop to such gravitational movement of the supporting member.

The novel features which are considered as characteristic of the invention are set forth in particular in the appended claims. The invention itself, however, both as to its construction and its method of operation, together with additional objects and advantages thereof, will be best understood from the following detailed description of a specific embodiment with reference to the accompanying drawings, in which:

Figure 1:
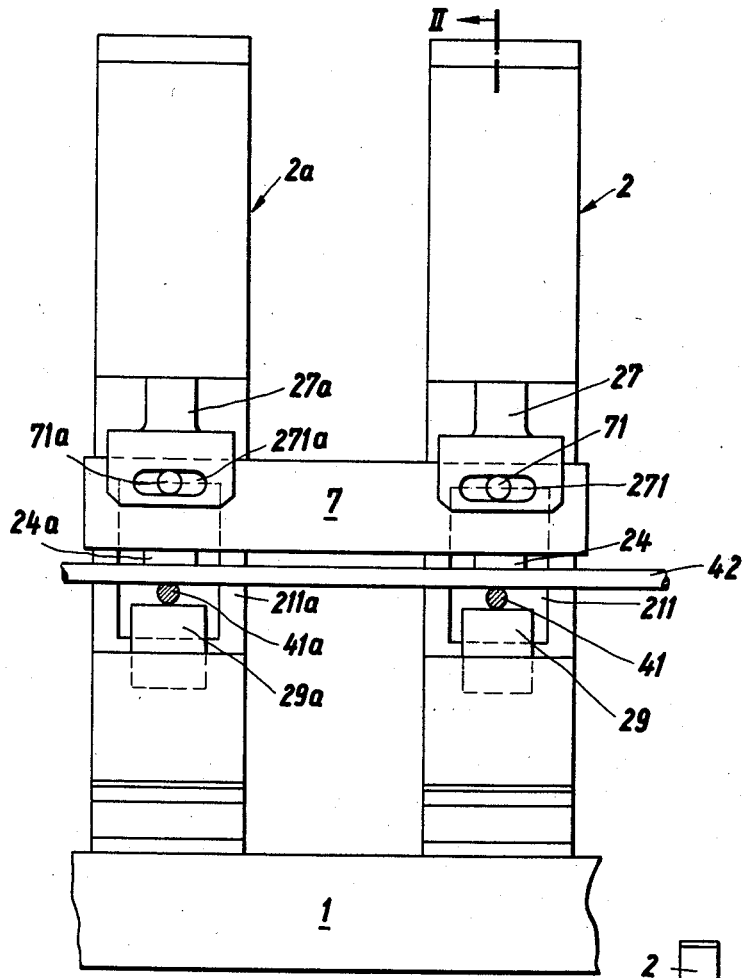
FIG. 1 is a somewhat schematic front elevational view of a cross-wire welding machine which embodies my invention and which (for the sake of simplicity) is assumed to comprise only two pairs of welding electrodes.
Figure 2:
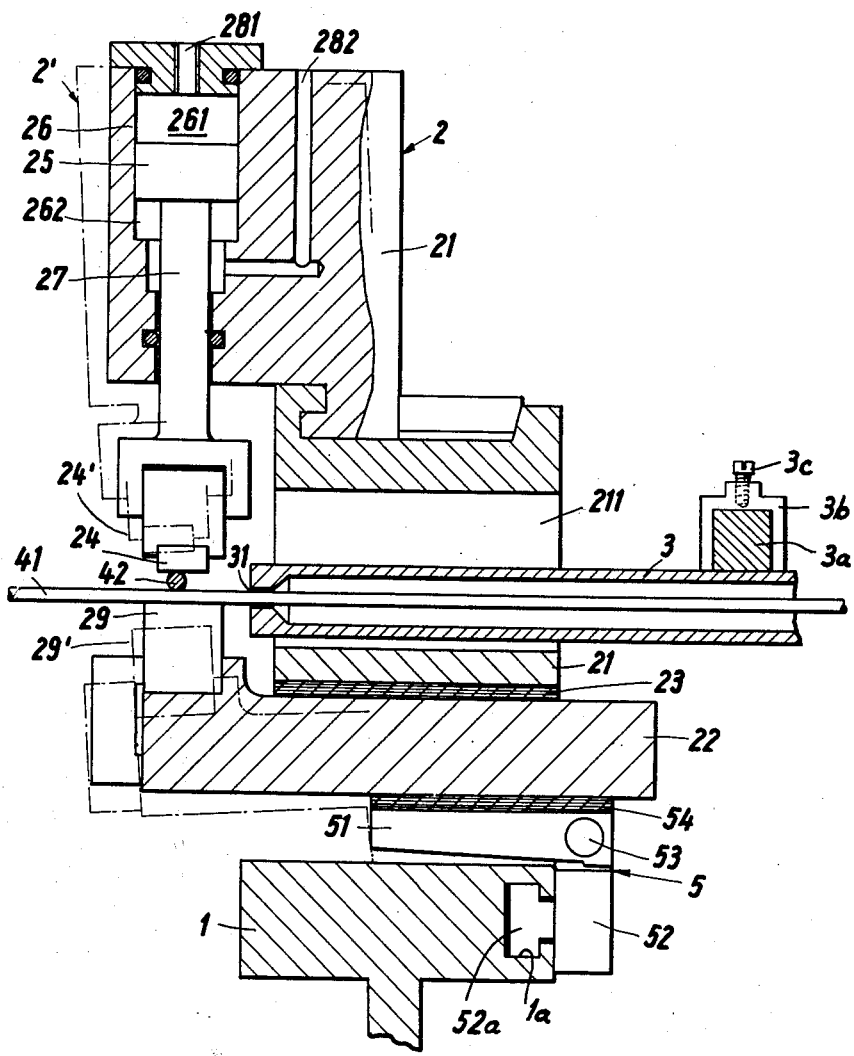
FIG. 2 is a vertical section through the supporting member for one pair of welding electrodes as seen in the direction of arrows from the line II—II of FIG. 1.

Referring now in greater detail to the illustrated embodiment, and first to FIGS. 1 and 2, there is shown a cross-wire welding machine which is utilized for the manufacture of concrete reinforcing mesh, fence wire, gadgets of many forms and other products consisting of intersecting longitudinally and transversely extending wire- or rod-like components. The machine comprises a main supporting means here shown as an elongated horizontal carrier or beam 1 which extends widthwise of the machine, i.e., at right angles to the longitudinal wires or rods 41, 41a and in parallelism with the transverse wires 42. The wires 41, 41a are located in a common horizontal plane. The carrier 1 supports a series of supporting members (hereinafter called welding units), one for each longitudinal wire. The drawings show only two such units (2 and 2a) which are used to support pairwise arranged welding electrodes serving as a means for consecutively welding transverse wires 42 to spaced portions of longitudinal wires 41, 41a. Of course, the machine may comprise a large number of such welding units, depending on the nature of the work to be manufactured therein, i.e., on the number of longitudinal wires in the ultimate product.

Each welding unit cooperates with a separate guide means for the respective longitudinal wire. One such guide means is illustrated at 3 in FIG. 2, and this guide means preferably assumes the form of a tubular member which extends into close proximity of the actual welding station at which the transverse wire 42 is actually joined to the wire 41. As shown, the axis of the tubular guide member 3 is perpendicular to the longitudinal extension of the carrier 1. Suitable supporting means, shown in FIG. 2 as a rail 3a· is provided to support the guide member 3 in such a way that the latter is shiftable therealong to assume a requisite positon of adjustment with respect to the other guide member (not shown) which directs the longitudinal wire 41a to the spot welding unit 2a. The rail 3a is parallel with the carrier 1. The member 3 may be fixed in a selected position of adjustment by a clamping means including a screw bolt 3c which engages the rail 3a and which is screwed into a bracket 3b rigidly mounted on the member 3. If the operator desires to convert the machine for the manufacture of different products in which the longitudinal wires 41, 41a are nearer to or more distant from each other, the bolts 3c are unscrewed and the guide members 3 are shifted along the rail 3a to new positions of adjustment.

The welding unit 2 comprises an upper portion 21 and a lower portion 22. These portions are rigidly connected to each other and are electrically insulated from each other by a layer 23 of suitable insulating material. The upper portion 21 serves as an indirect support for an upper electrode 24 which is reciprocable with respect thereto by the piston rod 27 of a double-action piston 25 received in a cylinder 26 which is rigid with the upper portion 21. The device including the piston 25, the cylinder 26 and the piston rod 27 also serves as a means for generating electrode force (welding pressure) on the wire 42. The upper chamber 261 of the cylinder 26 communicates with a duct 281 leading to a source of pressure fluid (e.g., oil) and the lower chamber 262 of this cylinder communicates with a second duct 282. As is well known in the art of double-acting pistons, the chambers 261, 262 are selectively connectable with the source of pressure fluid to move the piston rod 27 upwardly or downwardly in order to respectively shift the electrode 24 out of and into engagement with the wire 42 of the work which includes the wires 41, 41a, 42. The system of valves which regulate the flow of pressure fluid into and out of the chambers 261, 262 is not illustrated in the drawings. Such valves are operated in synchronism with the means which advances the longitudinal wires 41, 41a at predetermined intervals and constitute component parts of all conventional cross-wire welding machines; therefore, I do not consider it necessary to show such valves, it being sufficient to state that, when the duct 281 admits pressure fluid to the chamber 261 while the duct 282 permits spent fluid to escape from the chamber 262, the electrode 24 is moved downwardly, as viewed in FIG. 2, and engages a newly introduced transverse wire 42 to press this wire with requisite force against the longitudinal wire 41. When the welding step is completed, the duct 282 admits pressure fluid to the chamber 262 and the duct 281 permits spent fluid to escape from the chamber 261 whereby the welding unit 2 assumes the phantom-line position 2' in which the electrode 24 (occupying the phantom-line position 24') is moved upwardly and away from the wire 42.

The lower portion 22 of the spot welding unit 2 is rigidly connected with a second electrode 29 which may engage the underside of the longitudinal wire 41 at a point opposite the electrode 24. It will be noted that the upper portion 21 defines a passage or channel 211 which loosely receives the forward end of the guide member 3. The nozzle 31 of this guide member extends into close proximity of the electrodes 24, 29.

The lower portion 22 is pivotally supported by a hinge 5 which is longitudinally movably secured to the carrier 1. This hinge comprises a lower section or leaf 52 which is provided with a T-shaped projection 52a slidable in a complementary groove 1a machined into the rear face of the carrier 1 so that the entire welding unit 2 may be shifted along the carrier 1 in the same way as the guide member 3 is shiftable along the rail 3a. The upper section or leaf 51 of the hinge 5 is connected with the lower section 52 by a horizontal pintle 53, and this upper section is rigid with an insulating layer 54 provided at the underside of the lower portion 22 so that the latter may pivot about the pintle 53. Suitable fastening means (not shown) may be provided for holding the lower hinge section 52 in selected positions of adjustment with respect to the carrier 1 or, alternately, the friction between the projection 52a and the walls of the groove 1a may be sufficient to prevent unintentional displacements of the unit 2.

The second welding unit 2a is of identical construction and certain of its parts are identified in FIG. 1 by reference numerals corresponding to those used in connection with the unit 2, each followed by the letter a. Of course, and as explained hereinabove, the machine of my invention may and often does comprise three, four or more welding units each of which is then constructed and mounted in the same manner as the unit 2 or 2a. All such units are pivotable about a common horizontal axis which coincides with the axis of the pintle 53.

Figure 3:
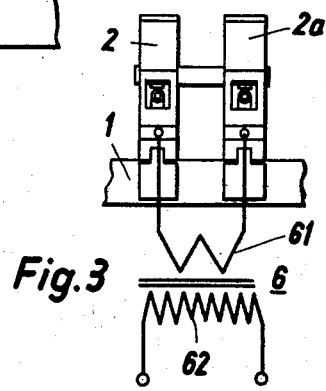
FIG. 3 is a smaller-scale schematic front elevational view of the welding machine, showing the manner in which a welding transformer is connected with one of each pair of welding electrodes.

The machine further comprises a welding transformer 6 for each pair of units 2, 2a. FIG. 3 shows that the terminals of the secondary winding 61 of the transformer 6 are connected with the electrodes 29, 29a of the units 2, 2a, respectively (by means of suitable flexible conductors which permit the electrodes 29, 29a to pivot about the respective pintles 53). The primary winding 62 of this transformer is connected to a suitable source of electrical energy. This source may supply current to one or more additional welding transformers if the machine of my invention comprises two or more pairs of welding units. The customary means used to open and close the circuit to the welding transformer is not shown in the drawings.

The upper electrodes 24, 24a of the units 2, 2a are connected by a current-conducting bridge 7 which is shown in FIG. 1. This bridge is slidably secured to the lower ends of piston rods 27, 27a by means of pins or bolts 71, 71a which extend into horizontal slots 271, 271a of the respective piston rods. Thus, the piston rods 27, 27a may follow the movements of the units 2, 2a toward or away from each other to the extent determined by the length of the slots 271, 271a. The bolts 71, 71a may be withdrawn if it should become necessary to replace the bridge 7 by a shorter or longer bridge, i.e., if the distance between the electrodes 24, 24a should be changed to an extent greater than permitted by the length of the slots 271, 271a.

Referring again to FIG. 2, the phantom lines 2' show the welding unit 2 in inoperative position, i.e., when the chamber 262 is filled with fluid and when hte chamber 261 discharges spent fluid through the duct 281. In such position of the unit 2, the electrodes 24, 29 respectively assume the phantom-line positions 24', 29' in which they are spaced from the wires 41, 42 so that the wires may be advanced in a direction to the left, as viewed in FIG. 2, without rubbing against the electrodes. When the chamber 262 receives pressure fluid to retract the piston rod 27 in upward direction, the entire unit 2 pivots by gravity about the axis of the pintle 53 until the underside of the section 51 comes into abutment with the upper face of the carrier 1 which then prevents further anticlockwise movement of the unit. The passage 211 is dimensioned in such a way that the guide member 3 is not affected by pivotal movements of the unit 2. The wire 41 is advanced while the unit 2 remains in its phantom-line position, whereupon the valve system of the welding machine admits pressure fluid to the upper chamber 261 to move the piston rod 27 in downward direction and to advance the electrode 24 into engagement with a newly inserted transverse wire 42. Once the electrode 24 advances into abutment with the newly introduced wire 42, and if the piston rod 27 continues to descend, the entire unit 2 begins to pivot about the pintle 53 until the lower electrode 29 rises into actual abutment with the wire 41. When the joint of wires 41, 42 is subjected to requisite pressure generated by the fluid filling the upper chamber 261, the circuit of the generator 6 is completed so that the welding current completes the formation of the joint. The direction in which the electrodes 24, 29 move between their operative and idle positions in substantially perpendicular to the longitudinal directions of the wires 41, 42 and to the axis of the pintle 53.

In the apparatus of FIG. 1 which is shown as comprising only two welding units 2, 2a, the current flows from the electrode 29a through the intersection of wires 41a, 42 to the electrode 24a, thence through the bridge 7 and upper electrode 24 to the intersection of wires 41, 42 and through the lower electrode 29. A branch current flows from the electrode 29a through the wire 42 and to the electrode 29, i.e., instead of flowing through the electrode 24a, through the bridge 7 and electrode 24, this branch current flows through that portion of the transverse wire 42 which extends between the adjacent units 2, 2a. Of course, if the machine comprises two or more pairs of welding units, all of such units are operated at the same time to insure that each newly introduced transverse wire 42 is welded to each of the longitudinal wires in a simultaneous step.

An important advantage of my welding machine is that, even though only one electrode (24, 24a) of each welding unit is reciprocable with respect to its unit, both electrodes move away from the work when the reciprocable electrode is moved to its idle or retracted position. Thus, and as shown in FIG. 2, even though the lower electrode 29 is rigid with the lower portion 22 of the unit 2, this lower electrode moves away from the wire 41 as soon as the upper electrode 24 is caused to perform a stroke in a direction away from the wire 42. Consequently, the wear on the electrodes is reduced to a minimum because the work is prevented from rubbing against the electrodes at the time its components (wires 41, 41a, 42) are caused to move with respect to the units 2, 2a. In other words, even though each welding unit comprises a single reciprocating and pressure generating means, such single means is sufficient to move both electrodes away from the work because the entire unit is pivotable with respect to its carrier. Furthermore, such single reciprocating and pressure generating means is sufficient to return both electrodes of the respective unit to their operative positions by causing the unit to pivot with respect to its carrier as soon as the reciprocable electrode (24 or 24a) moves into abutment with the work.

Another important advantage of such construction and mounting of the electrodes and of the spot welding units is that the electrodes will properly engage and compress the intersecting wires even if their work-engaging surfaces are worn away, i.e., the stroke of the piston 25 is of sufficient length to insure that the electrodes 24, 29 will properly engage the wires 41, 42 even after the electrodes were subjected to long-lasting use.

It will be readily understood that the electrodes 24, 24a may be reciprocable by a liquid other than oil and that the hydraulic reciprocating and pressure generating means of each unit may be replaced by a pneumatic or mechanical system.

In accordance with a slight modification of my invention which is so obvious that it may be readily comprehended without additional illustration, each spot welding unit may assume the form of welding tongs whose halves are pivotally connected by a pin corresponding to the pintle 53 of FIG. 2. One of such sections then carries a reciprocable electrode which causes the other section to pivot about the connecting pin and to move the other electrode into abutment with the work as soon as the work is engaged by the reciprocable electrode.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In a welding machine, particularly for forming joints between intersecting longitudinal and transverse wire-like components which form a comparatively rigid net-like work, in combination; a supporting member; carrier means pivotally mounting said supporting member so that the latter is pivotable about a fixed axis; a first electrode fixed to said supporting member; a second electrode reciprocable toward and away from said first electrode; guide means for guiding the work between said electrodes; and pressure generating means mounted on said supporting member and operatively connected with said second electrode for reciprocating the same toward, into and subsequent to engagement with the work in a path which crosses said fixed axis in space whereby, once said second electrode engages the work and said pressure generating means continues to move said second electrode toward said first electrode, said supporting member pivots with respect to said carrier means to move said first electrode into engagement with the work.

2. In a welding machine, particularly for forming joints between intersecting longitudinal and transverse wire-like components which form a comparatively rigid net-like work, in combination, a pair of spaced supporting members; carrier means pivotally mounting said supporting members so that the latter is pivotable about a fixed axis; a first electrode fixed to each of said supporting members; a pair of second electrodes each reciprocable toward and away from one of said first electrodes; a pair of guide means for respectively guiding a longitudinal component of the work between each first and second electrode; pressure generating means mounted on each of said supporting members and operatively connected with the respective second electrodes for reciprocating the same toward, into and subsequent to engagement with the work in a path which crosses said fixed axis in space whereby, once said second electrodes engage the work and the respective pressure generating means continue to move said second electrodes toward the respective first electrodes, said supporting members pivot with respect to said carrier means to move said first electrodes into engagement with the work opposite the respective first electrodes; a welding generator comprising a primary and a secondary winding, said secondary winding having terminals connected with said first electrodes; and current-conducting bridge means connecting said second electrodes.

3. In a welding machine, particularly for forming joints between intersecting longitudinal and transverse wire-like components which form a comparatively rigid net-like work, in combination, a pair of spaced supporting members; carrier means pivotally mounting said supporting members so that the latter are pivotable about a fixed axis; a first electrode fixed to each of said supporting members; a pair of second electrodes each reciprocable toward and away from one of said first electrodes; a pair of guide means for respectively guiding a longitudinal component of the work between each first and second electrode; and pressure generating means mounted on each of said supporting members and operatively connected with the respective second electrodes for reciprocating the same toward, into and subsequent to engagement with the work in a path which crosses said fixed axis in space whereby, once said second electrodes engage the work and the respective pressure generating means continue to move said second electrodes toward the respective first electrodes, said supporting members pivot with respect to said carrier means to move said first electrodes into engagement with the work opposite the respective first electrodes.

4. In a welding machine, particularly for forming joints between intersecting longitudinal and transverse wire-like components which form a comparatively rigid net-like work, in combination, a horizontal carrier; a pair of spaced supporting members each having a lower portion hinged to said carrier and an upper portion which is electrically insulated from and which is rigid with the respective lower portion, said lower portions being pivotable with respect to said carrier about a common horizontal axis; a lower electrode rigidly fixed to the lower portion of each supporting member; an upper electrode reciprocable toward and away from each of said lower electrodes; a pair of horizontal guide means for respectively guiding a longitudinal component of the work between each upper and lower electrode; and pressure generating means mounted on each of said upper portions and operatively connected with the respective upper electrodes for reciprocating the same toward, into and subsequent to engagement with the work in a path which crosses said horizontal axis in space whereby, once said upper electrodes engage the work and the respective pressure generating means continue to move said upper electrodes toward the respective lower electrodes, said supporting members pivot with respect to said carrier to move said lower electrodes into engagement with the work opposite the respective upper electrodes.

5. In a welding machine, particularly for forming joints between intersecting longitudinal and transverse wire-like components which form a comparatively rigid net-like work, in combination; a supporting member; carrier means pivotally mounting said supporting member so that the latter is pivotable about a fixed axis; a first electrode fixed to said supporting member; a second electrode reciprocable toward and away from said first electrode in a path substantially at right angles to and spaced from said fixed axis; guide means for guiding the work between said electrodes; and pressure generating means mounted on said supporting member and operatively connected with said second electrode for reciprocating the same in said path toward, into and subsequent to engagement with the work whereby, once said second electrode engages the work and said pressure generating means continues to move said second electrode toward said first electrode, said supporting member pivots with respect to said carrier means to move said first electrode into engagement with the work.

6. In a welding machine, particularly for forming joints between intersecting longitudinal and transverse wire-like components which form a comparatively rigid net-like work, in combination; an elongated carrier; a pair of spaced supporting members; hinge means pivotally connecting said supporting members to said carrier so that each supporting member is pivotable about an axis which is parallel with the longitudinal extension of said carrier, said hinge means being movable longitudinally of said carrier to move said supporting members toward or away from each other; a first electrode fixed to each of said supporting members; a second electrode reciprocable toward and away from each of said first electrodes; a pair of guide means for respectively guiding a longitudinal component of the work between each first and second electrode so that such longitudinal components are substantially perpendicular to said axis; and pressure generating means mounted on each of said supporting members and operatively connected with the respective second electrodes for reciprocating the same toward, into and subsequent to, engagement with the work in a path which crosses said axis in space whereby, once said second electrodes engage the work and the respective pressure generating means continue to move said second electrodes toward the respective first electrodes, said supporting members pivot with respect to said carrier to move said first electrodes into engagement with the work opposite the respective first electrodes.

7. In a welding machine, particularly for forming joints between intersecting longitudinal and transverse wire-like components which form a comparatively rigid net-like work, in combination; an elongated carrier; a pair of spaced supporting members; hinge means pivotally connecting said supporting members to said carrier so that each supporting member is pivotable about an axis which is parallel with the longitudinal extension of said carrier, said hinge means being movable longitudinally of said carrier to move said supporting members toward or away from each other; a first electrode fixed to each of said supporting members; a second electrode reciprocable toward and away from each of said first electrodes in a path substantially perpendicular to and spaced from said axis; a pair of guide means for respectively guiding a longitudinal component of the work between each first and second electrode so that such longitudinal components are substantially perpendicular to said axis and to directions in which said second electrodes reciprocate; and pressure generating means mounted on each of said supporting members and operatively connected with the respective second electrodes for reciprocating the same in said path toward, into and subsequent to engagement with the work whereby, once said second electrodes engage the work and the respective pressure generating means continue to move said second electrodes toward the respective first electrodes, said supporting members pivot with respect to said carrier to move said first electrodes into engagement with the work opposite the respective second electrodes.

8. In a welding machine, particularly for forming joints between intersecting longitudinal and transverse wire-like components which form a comparatively rigid net-like work, in combination; an elongated carrier; a pair of spaced supporting members; hinge means pivotally connecting said supporting members to said carrier so that each supporting member is pivotable about an axis which is parallel with the longitudinal extension of said carrier, said hinge means being movable longitudinally of said carried to move said supporting members toward or away from each other; a first electrode fixed to each of said supporting members; a second electrode reciprocable toward and away from each of said first electrodes; a pair of guide means for respectively guiding a longitudinal component of the work between each first and second electrode so that such longitudinal components are substantially perpendicular to said axis; elongated supporting means extending in substantial parallelism with said carrier; clamping means detachably securing said guide means to said supporting means so that each of said guide means may assume different positions of adjustment with respect to said supporting means; and pressure generating means mounted on each of said supporting members and operatively connected with the respective second electrodes for reciprocating the same toward, into and subsequent to, engagement with the work in a path which crosses said axis in space whereby, once said second electrodes engage the work and the respective pressure generating means continue to move said second electrodes toward the respective first electrodes, said supporting members pivot with respect to said carrier to move said first electrodes into engagement with the work opposite the respective second electrodes.

9. In a welding machine, particularly for forming joints between intersecting longitudinal and transverse wire-like components which form a comparatively rigid net-like work, in combination; a supporting member; carrier means pivotally mounting said supporting member; a first electrode fixed to said supporting member so that the latter is pivotable about a fixed axis; a second electrode reciprocable toward and away from said first electrode, said supporting means having passage means extending into close proximity of said electrodes; guide means for guiding the work between said electrodes, said guide means extending through said passage means and having nozzle means adjacent to said electrodes; and pressure generating means mounted on said supporting member and operatively connected with said second electrode for reciprocating the same toward, into and subsequent to engagement with the work in a path which crosses said fixed axis in space whereby, once said second electrode engages the work and said pressure generating means continues to move said second electrode toward said first electrode, said supporting member pivots with respect to said carrier means to move said first electrode into engagement with the work.

10. In a welding machine, particularly for forming joints between intersecting longitudinal and transverse wire-like components which form a comparatively rigid net-like work, in combination, a pair of spaced supporting members; elongated carrier means pivotally mounting said supporting members so that the supporting members are pivotable about a common axis; a first electrode fixed to each of said supporting members; a second electrode reciprocable toward and away from each of said first electrodes in a path substantially perpendicular to and spaced from said axis; guide means for guiding a longitudinal component of the work between each first and second electrode; and pressure generating means mounted on each of said supporting members for reciprocating the respective second electrodes in said path toward, into and subsequent to engagement with the work whereby, once said second electrodes engage the work and the respective pressure generating means continue to move said second electrodes toward the respective first electrodes, said supporting members pivot about said common axis to move said first electrodes into engagement with the work opposite the respective second electrodes, each of said pressure generating means comprising a cylinder mounted on the respective supporting member, a double-acting piston reciprocably received in the respective cylinder, and a piston rod rigid with the respective piston and connected with the respective second electrode.

11. A combination as set forth in claim 10, wherein said supporting members are movable longitudinally of said carrier means toward and away from each other, and further comprising current conducting bridge means connecting said second electrodes with each other, said bridge means being movable with respect to said piston rods in directions parallel with the longitudinal extension of said carrier means.

12. A combination as set forth in claim 11, wherein each of said piston rods is provided with an elongated slot and said bridge means comprises pins extending into each of said slots.

13. In a welding machine, particularly for forming joints between intersecting longitudinal and transverse wire-like components which form a comparatively rigid net-like work, in combination, a pair of spaced supporting members; elongated carrier means pivotally mounting said supporting members so that the supporting members are pivotable about a common horizontal axis; a first electrode fixed to each of said supporting members; a second electrode located above and reciprocable toward and away from each of said first electrodes in paths substantially perpendicular to and spaced from said axis; horizontal guide means for guiding a longitudinal component of the work between each first and second electrode substantially at right angles to said axis; and pressure generating means mounted on each of said supporting members for reciprocating the respective second electrodes in said path toward, into and subsequent to engagement with the work whereby, once said second electrodes engage the work and the respective pressure generating means continue to move said second electrodes toward the respective first electrodes, said supporting members pivot about said common axis to move said first electrodes into engagement with the work opposite the respective second electrodes, each of said pressure generating means comprising a cylinder mounted on the respective supporting member, a double-acting piston reciprocably received in the respective cylinder, and a piston rod rigid with the respective piston and connected with the respective second electrode.

14. A combination as set forth in claim 4, further comprising a welding transformer having a primary and a secondary winding, said secondary winding having terminals connected with said lower electrodes, and current-conducting bridge means connecting said upper electrodes.

15. In a welding machine, particularly for forming joints between intersecting longitudinal and transverse wire-like components which form a comparatively rigid net-like work, in combination, a supporting member; carrier means pivotally mounting said supporting member so that the latter is pivotable about a fixed axis; a first electrode fixed to said supporting member; a second electrode reciprocable toward and away from said first electrode; guide means for guiding the work between said electrodes; and pressure generating means mounted on said supporting member and operatively connected with said second electrode for moving the same toward and into engagement with the work in a path which crosses said fixed axis in space and for thereupon pivoting said supporting member about said fixed axis to move said first electrode into engagement with the work opposite said second electrode.

References Cited by the Examiner
UNITED STATES PATENTS

| 2,341,459 | 2/44 | Martin | 219—89 |
| 2,375,439 | 5/45 | Rokosh | 219—86 |

RICHARD M. WOOD, *Primary Examiner.*